Figure 1:
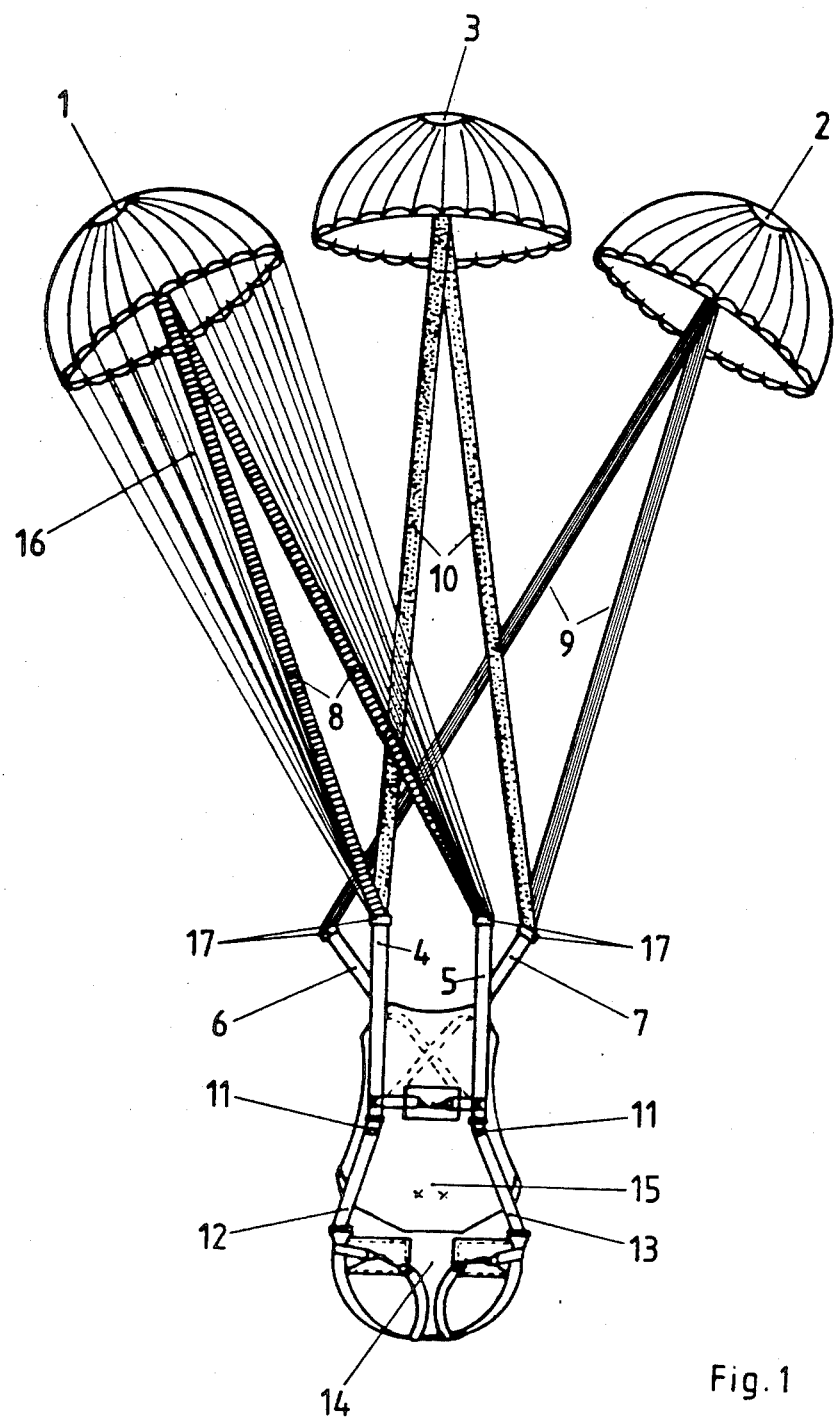

United States Patent [19]

Logemann

[11] Patent Number: 4,687,160
[45] Date of Patent: Aug. 18, 1987

[54] PARACHUTE SYSTEM

[75] Inventor: Horst Logemann, Hillscheidt, Fed. Rep. of Germany

[73] Assignee: Bruggemann & Brand GmbH & Co. KG, Wetter Ruhr, Fed. Rep. of Germany

[21] Appl. No.: 847,173
[22] PCT Filed: Apr. 3, 1985
[86] PCT No.: PCT/EP85/00151
    § 371 Date: Mar. 11, 1986
    § 102(e) Date: Mar. 11, 1986
[87] PCT Pub. No.: WO86/00593
    PCT Pub. Date: Jan. 30, 1986

[30] Foreign Application Priority Data

Jul. 12, 1984 [DE] Fed. Rep. of Germany ....... 3425651

[51] Int. Cl.$^4$ ............................................. B64D 17/06
[52] U.S. Cl. .................................. 244/142; 244/151 R
[58] Field of Search .................. 244/142, 145, 151 R, 244/151 A, 151 B

[56] References Cited

U.S. PATENT DOCUMENTS 4,090,683  5/1983  Derrien et al. ................ 244/151 R

FOREIGN PATENT DOCUMENTS 1098379  1/1968  United Kingdom ................ 244/142

Primary Examiner—Galen Barefoot
Attorney, Agent, or Firm—Banner, Birch, McKie & Beckett

[57] ABSTRACT

The parachute system comprises three parachutes 1-3, whose shroud lines 16 are combined into partial bundles 8-10 are articulated via articulation points 17 to articulation straps 4-7.

The articulation is constructed as follows. The two partial bundles of the first parachute 1 are articulated to one articulation strap pair and the partial bundles of the second parachute 2 are articulated to the opposite articulation strap pair. The two partial bundles of the third parachute 3 are also articulated to an articulation strap of the first parachute 1 and to an articulation strap of the second parachute 2.

4 Claims, 3 Drawing Figures

PARACHUTE SYSTEM

The invention is based on a parachute system comprizing three separate parachutes with shroud lines together with the associated three-point harness, a canopy separating lock being provided on each of its left and right-side carrying straps, with articulation points for the shroud lines are fitted, as well as a packing sleeve containing a packing sack.

Such a parachute system is known from Report IB 154-75/13 of the Deutsche Forschungs- und Versuchsanstalt für Luft- und Raumfahrt E.V., Braunschweig, entitled "A parachute system for the 1980's" and a lecture with the same content.

In the known case, an articulation strap is provided for each canopy separating lock, the shroud lines of all three parachutes being fixed to said strap in such a way that the shroud lines of a first parachute are all articulated to one articulation strap, the shroud lines of a second parachute are all articulated to another articulation strap and the shroud lines of a third parachute are articulated to both articulation straps.

Such an articulation, which is also called a two-point articulation, suffers from the disadvantage that the parachutes and shroud lines can, during the descent or fall phase, twist within themselves and within the complete parachute system, which impairs the flying characteristics, but in particular endangers the parachutist.

In addition, during opening, the individual parachutes can impede one another. Due to the limited jump height, this type of articulation represents a considerable safety hazard for the parachutist.

The problem of the present invention is to provide an articulation between shroud lines and articulation straps for a parachute system, which is suitable for articulating all six shroud line bundles of the parachutes to the articulation straps of the harness in such a way that the three parachutes can open rapidly and without impeding one another and which cannot twist during the descent phase, whilst being rapidly detachable from the harness by the parachutist after landing.

On the basis of the features of the preamble of claim 1, according to the invention this problem is solved by its characterizing features. As a result of the advantageous articulation of all the shroud line bundles to the articulation points of the articulation strap, it is possible to so fix the six shroud line bundles of the three parachute canopies to the articulation points of the four articulation straps in such a way that a troublefree, rapid opening of all three canopies is possible during a short descent phase. It is no longer possible for the parachutes to twist. It is also ensured that the parachute system is subject to much less damage.

The arrangement according to the invention also permits an easy packing process, because the now quadruple and no longer double-articulated shroud line bundle can be more easily drawn from the pack on jumping.

There is also an overall increase in operational safety. After landing, such an arrangement permits a rapid parachute - parachutist separation, because only two per se known canopy separating locks are used. This type of articulation leads to an overall and significant reduction in the safety risk for the parachutist.

Figure 2:
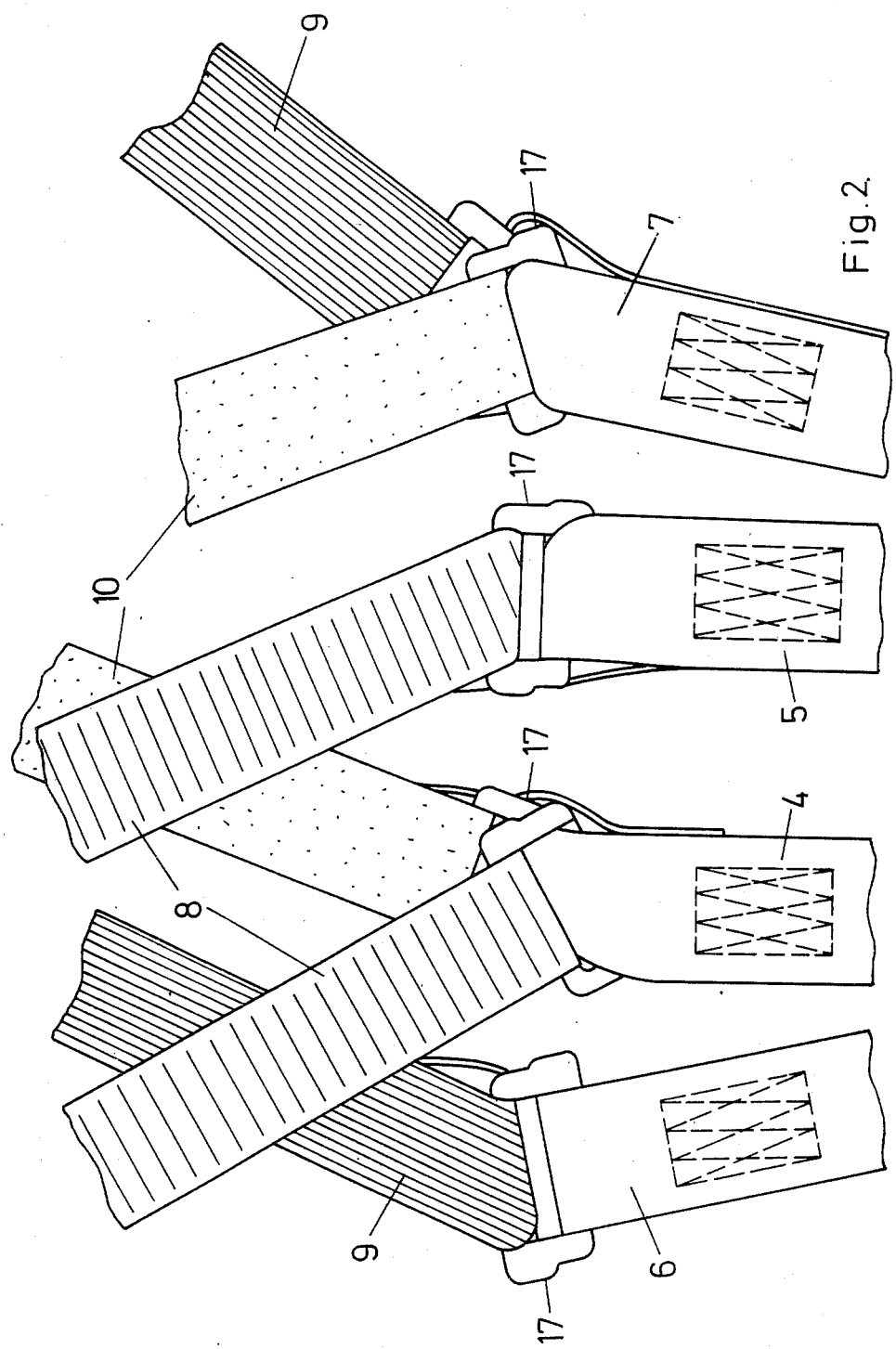
Figure 3:
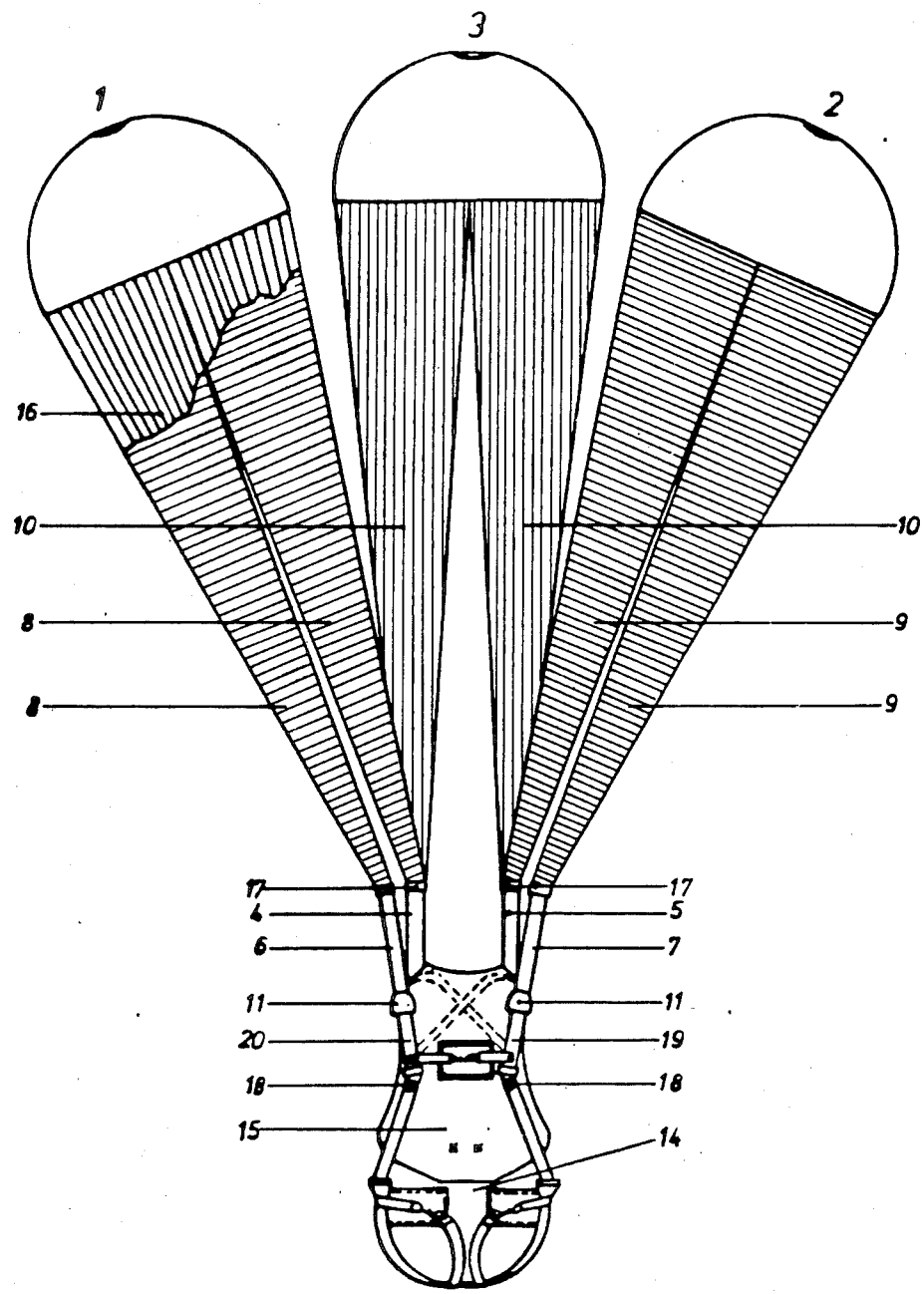

An embodiment of the invention is described hereinafter relative to the drawing, wherein show:

FIG. 1: the parachutes with harness and articulation.
FIG. 2: a larger scale view of the articulation.
FIG. 3: an articulation variant.

FIG. 1

FIG. 1 shows the parachute system according to the invention during the descent phase, because it is then possible to see the articulation more easily. A parachutist is not shown so as not to overburden the drawing.

The parachute system comprises a first parachute 1, a second parachute 2 and a third parachute 3. Each parachute is equipped with shroud lines 16, but these are only shown on the first parachute 1. In the case of each of the parachutes, these shroud lines 16 are combined into in each case two partial bundles 8-10, which are fitted to four articulation straps 4-7 by means of per se known articulation points 17. In each case two of the four articulation straps with their ends remote from the articulation point 17 are combined in a canopy separating lock 11.

The two thus combined articulation straps can be arranged in the canopy separating lock 11 both successively and in juxtaposed manner. As it is easier to see, the description of the embodiment is based on a successive arrangement.

A canopy separating lock 11 is detachably connected to a left-hand supporting strap 12, and a canopy separating lock 11 is detachably connected to a right-hand supporting strap 13 of a three-point harness, 14. The in all six partial bundles 8-10 of parachutes 1-3 are fitted in the following manner to the four articulation straps 4-7.

Of the two partial bundles 8 (horizontally hatched) of the first parachute 1 one is articulated to the left-hand articulation strap 4 and the other to the right-hand articulation strap 5. Of the two partial bundles 9 (longitudinally hatched) of the second parachute 2 one is articulated to the other left-hand articulation strap 6 and the second to the other right-hand articulation strap 7. The two partial bundles 10 of the third parachute 3 are articulated to the left-hand articulation strap 4 of the first parachute 1 and to the other right-hand articulation strap 7 of the second parachute 2.

However, articulation can take place in such a way that the partial bundle 8 of the first parachute 1 are articulated to the articulation straps of the second parachute 2, whose partial bundles 9 are then fitted to the articulation straps of the first parachute 1.

It is also possible for the partial bundles 10 of the third parachute to be articulated to the other left-hand articulation strap 6 and to the right-hand articulation strap 5.

FIG. 2

FIG. 2 shows the articulation in even greater detail. Partial bundles 8-10 of the three parachutes 1-3 are articulated to articulation straps 4-7 in the manner already described in FIG. 1. Partial bundle 8 of first parachute 1 is horizontally hached, partial bundle 9 of second parachute 2 is longitudinally hached and partial bundle 10 of third parachute 3 represented in dotted line form. The partial bundle 10 of the third parachute is clearly also articulated to the left-hand articulation strap 4 and to the other right-hand articulation strap 7.

FIG. 3

FIG. 3 shows a further articulation variant. The partial bundle 8 of the first parachute 1 are articulated to the left-hand articulation strap 4 and to the other left-hand articulation strap 6, the partial bundles 9 of the second parachute 2 being articulated to the right-hand articulation strap 5 and to the other right-hand articulation strap 7.

The partial bundles 10 of the third parachute 3 are in the presently represented form also articulated to another left-hand articulation strap 6 of the first parachute 1 and to another right-hand articulation strap 7 of the second parachute 2.

However, this articulation variant can also be constructed in such a way that the partial bundles 10 of the third parachute are in each case articulated to the left-hand articulation strap 4 of the first parachute 1 and to a right-hand articulation strap 5 of the second parachute 2.

In place of the presently shown circular connecting element, the articulation point can also be constructed in such a way that the partial bundles are directly sewn to the particular articulation straps.

LIST OF REFERENCE NUMERALS

1: first parachute,
2: second parachute,
3: third parachute,
4: left-hand articulation strap,
5: right-hand articulation strap,
6: other left-hand articulation strap,
7: other right-hand articulation strap,
8: partial bundle of first parachute,
9: partial bundle of second parachute,
10: partial bundle of third parachute,
11: canopy separating lock,
12: left-hand supporting strap,
13: right-hand supporting strap,
14: three-point harness,
15: packing sleeve,
16: shroud lines,
17: articulation points.

I claim:

1. Parachute system comprising three separate parachutes (1–3) with shroud lines (16), together with the associated three-point harness (14), a canopy separating lock (11) being provided both on the left-hand (12) and right-hand (13) supporting strap, articulation straps (4–7) with articulation points (17) for the shroud lines (16) being fitted to said lock (11), together with a packing sleeve containing a packing sack, characterized in that there are two articulation straps (4–7) for each canopy separating lock (11) and substantially all of the shroud lines of each of the three parachutes are combined in each case to form two partial bundles (8–10) being fixed to said straps in such a way that the two partial bundles of the first parachute (1) are articulated to two of said articulation straps and the two partial bundles of the second parachute (2) to the other two of said articulation straps, and that of the two partial bundles of the third parachute (3) one is also articulated to one of the articulation straps to which one partial bundle of the first parachute (1) is articulated and the other to one of the articulation straps to which one partial bundle of the second parachute (2) is articulated.

2. Parachute system according to claim 1, characterized in that of the two partial bundles (8) of the first parachute (1), a partial bundle is articulated to a left-hand articulation strap (4) and another partial bundle is articulated to another left-hand articulation strap (6) and of the two partial bundles (9) of the second parachute (2) one partial bundle is articulated to the right-hand articulation strap (5) and another partial bundle to the other right-hand articulation strap (7).

3. Parachute system according to claim 1, characterized in that of the two partial bundles of the first parachute (1), one is articulated to a left-hand articulation strap (4) and the other to a right-hand articulation strap (5) and of the two partial bundles of the second parachute (2) one is articulated to the other left-hand articulation strap (6) and the other to the other right-hand articulation strap (7).

4. Parachute system according to one of the claims 1 to 3, characterized in that both the left-hand articulation straps (4, 6) and the right-hand articulation straps (5, 7) have a common fixing area in the in each case associated canopy separating lock (11) (FIG. 2).

* * * * *